United States Patent [19]

Fuchs et al.

[11] Patent Number: 5,343,042
[45] Date of Patent: Aug. 30, 1994

[54] SELECTIVE MODIFICATION OF INDIVIDUAL NANOMETER AND SUBNAMOMETER STRUCTURES IN THE SURFACE OF A SOLID

[75] Inventors: Harald Fuchs, Carlsberg; Thomas Schimmel, Hof, both of Fed. Rep. of Germany

[73] Assignee: BASF Aktiengesellschaft, Ludwigshafen, Fed. Rep. of Germany

[21] Appl. No.: 894,133

[22] Filed: Jun. 4, 1992

[30] Foreign Application Priority Data

Jun. 20, 1991 [DE] Fed. Rep. of Germany ....... 4120365

[51] Int. Cl.$^5$ .............................................. H01J 37/00
[52] U.S. Cl. ................................ 250/307; 250/492.3; 369/126
[58] Field of Search ............ 250/398, 306, 307, 492.3, 250/423 F; 369/126

[56] References Cited

U.S. PATENT DOCUMENTS

| | | | |
|---|---|---|---|
| 4,878,213 | 10/1989 | Kazan et al. | 365/118 |
| 4,916,688 | 4/1990 | Foster et al. | 369/126 |
| 4,987,312 | 1/1991 | Eigler | 250/492.3 |
| 5,015,323 | 5/1991 | Gallagher | 250/492.3 |
| 5,138,174 | 8/1992 | Tang | 250/492.3 |
| 5,144,148 | 9/1992 | Eigler | 369/126 |
| 5,144,581 | 9/1992 | Toda et al. | 369/126 |
| 5,262,981 | 11/1993 | Rabe et al. | 369/126 |

*Primary Examiner*—Bruce C. Anderson
*Attorney, Agent, or Firm*—Keil & Weinkauf

[57] ABSTRACT

A process for the selective modification and reversible removal of extremely fine structures having dimensions of down to the nanometer and subnanometer range from the surface of a solid, comprises moving the fine tip of a probe, for example a surface-sensitive scanning probe, which is located at a distance in the Ångstrom range above the surface or is in contact with the surface, over the structure at essentially the same height and thus causing a change in this structure.

4 Claims, 1 Drawing Sheet

SELECTIVE MODIFICATION OF INDIVIDUAL NANOMETER AND SUBNAMOMETER STRUCTURES IN THE SURFACE OF A SOLID

BACKGROUND OF THE INVENTION

1. Field of Invention

The present invention relates to a process which allows selective modifications to be carried out on individual, existing, extremely small surface structures having dimensions in the nanometer and atomic range, and to the use of this process for storing information units in the nanometer and subnanometer range and for modifying prestored information units of this type.

2. Description of the Related Art

The controlled manipulation of already existing surface structures in the nanometer range is of particular interest in the area of nanotechnology. A process which allows such manipulations would make it possible, for example, to generate more complicated structures stepwise from simpler structures, for example rotationally symmetrical bumps, as can be produced by voltage pulses using the tunneling microscope, in a multistep process. Such capabilities could in turn form the basis for "nanoengineering", ie. for systematic material processing on a length scale of down to the nanometer and possibly atomic range.

On the other hand, consideration of possible applications of nanostructuring processes for data storage gives rise to the demand for not only the writing of information, but also for the erasure or selective modification of prestored information. It is desirable not only to be able to erase the entire data store, for example by thermal treatment, but also to be able to selectively erase individual information bit by bit and if required to re-write information at the same point.

An interesting perspective arises from the thought that not only one of two (binary) defined states which are clearly differentiable from one another can, if desired, be generated per position (for example "structure present" or "structure absent", corresponding to the numerical values "0" and "1" respectively and thus to an information content of 1 bit per position), but instead, for example, one of three or more defined states (for example "structure absent", "unmodified structure present" or "structure subsequently modified in a defined manner present", corresponding to the numerical values "0", "1" and "2" respectively and thus to an information content of more than 1 bit per position) can be generated.

In the past, various processes have been developed for generating surface structures on a nanometer scale. However, to achieve the abovementioned wishes, it is necessary to be able to modify such structures at any time after generation. It is desirable that a modification of this type can be carried out selectively and in a defined manner. Selectively means that the structure to be modified can be targeted individually and that the modification of a structure has no significant effects on adjacent structures. In a defined manner means that the effect of the modification is known, predictable and reproducible, ie. the structure is converted from a defined initial state to a defined final state.

SUMMARY OF THE INVENTION

It is an object of the present invention to provide a process which allows such a selective and defined modification of structures in the nanometer range and which can also be applied to larger structures.

DESCRIPTION OF THE PREFERRED EMBODIMENTS

We have found that this object is achieved by the process of the present invention, in which a probe having a very fine end, for example the tip of a surface-sensitive scanning probe, is positioned just above the surface alongside the structure to be modified and is subsequently moved over the structure at essentially the same distance from the plane of the unstructured sample surface (x/y plane in FIG. 1), causing a change in the structure.

Figure 1:
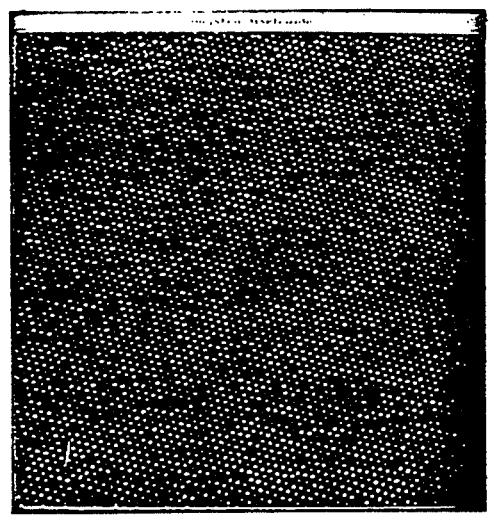
FIG. 1 shows an atomically ordered $WSe_2$ surface before modification.

The process also has the advantage that the extent of a desired change can be set continuously and in a controlled manner through the distance of the probe above the sample surface plane (a/b plane in FIG. 1). In addition, it can be selected whether the entire structure or only one of its side edges is to be modified by passing the probe over the center point of the structure (track a in FIG. 2; the unmodified structure is shown in plan view as the hatched area in FIG. 2) or only over one or more of its side edges (for example tracks b and c in FIG. 2). This also makes it possible to carry out a plurality of successive changes differing, for example, in the choice of the distance of the probe from the a/b plane and/or in the selected track of the probe, on the same structure.

For erasing existing surface structures or carrying out a number of consecutive modification processes on one and the same structure, it is of considerable advantage if the atomic order of the atomic lattice found is not locally disturbed or destroyed at the surface either during the process for generating the structures or in the modification process just described. In this respect, the use of layered structures, in particular of dichalcogenides, for example tungsten diselenide, $WSe_2$ proves particularly advantageous. Here, generation of surface structures with full retention of the atomic order of the surface observed by STM is possible both at and around the generated structure if the structures are generated mechanically by means of a fine probe or by applying voltage pulses between the sample and the probe.

If the probe used for the modification is a surface-sensitive scanning probe, for example the tip of a scanning tunneling microscope or of a scanning atomic force microscope, the structure can be imaged before and after modification has taken place, at atomic resolution if the choice of surfaces and measurement parameters is appropriate. It is thus also possible to carry out writing, reading, modification and erasing operations in any desired sequence at any desired positions using one and the same probe. The operating speed is limited only by technical data of the apparatus used. In the experiments described below, about 1 ms is required per individual operation.

The process according to the invention is illustrated below in illustrative terms:

The tip of a scanning tunneling microscope is used in three ways in the example below of an operation of this type in the nanometer range. Firstly, it is used to image the unchanged surfaces and the modified surfaces at atomic resolution; secondly, it is used to generate structures on the surface of the solid; and thirdly, it is used to modify these structures by the process according to the invention.

The process described can be carried, as desired, out under a wide variety of ambient conditions, for example under oil, in a high vacuum, in an ultra-high vacuum or under an inert gas. It is of particular practical importance that all the processes described can also be carried out under normal ambient conditions, ie. in air and at room temperature, and that the resultant structures and modifications are also stable under these conditions.

The surfaces used were sample surfaces of the layered semiconductor $WSe_2$, a dichalcongenide, prepared by the vapor phase transport method. Samples of this type have surfaces which are planar at the atomic level, are defect-free over very large regions, have a very good long-distance order and can easily be imaged at atomic resolution using the STM. An example of an atomically ordered $WSe_2$ surface of this type before surface modification is shown in FIG. 1. The individual atoms, visible as pale dots, are 0.33 nm apart. The imaging was achieved by applying a tunneling voltage of 0.8 V (tip as the positive pole) between the tip and the sample; the tunneling current was 3 nA.

Figure 2:
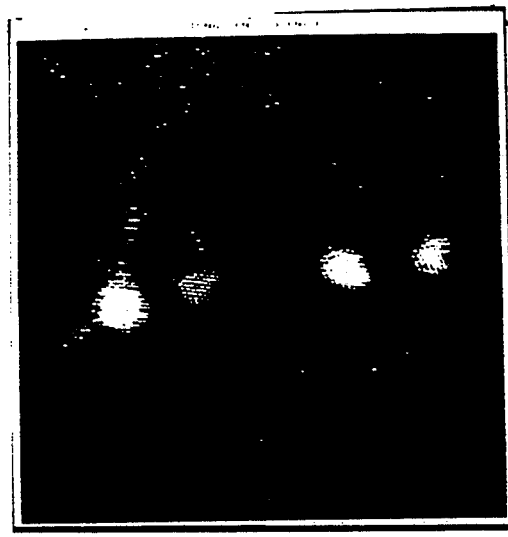
FIG. 2 shows four bumps in a line produced on the surface of FIG. 1 by a process according to this invention.

By addition of voltage pulses having an amplitude of about 2.5 V and a duration of a few milliseconds to the tunneling voltage, circular bumps were generated on the sample surface. The polarity of the pulses corresponded to the polarity of the tunneling voltage. With each pulse, precisely one bump was produced at the position at which the pulse was applied. It was possible to carry out the surface modifications during the normal imaging process of the STM without having to interrupt the scan of the tunneling tip over the sample surface. The resultant changes in the surface could be imaged at atomic resolution using the same tip immediately after the intervention. FIG. 2 shows four bumps in a line produced by means of four voltage pulses at the corresponding points.

The structures proved to be time-stable both in air and in vacuo (high vacuum or ultra-high vacuum), even if they and their environment are imaged without interruption by means of the tunneling microscope. In spite of several hundred imaging processes, none of the structures produced in this way exhibited any detectable changes, a finding which is particularly important since these imaging processes correspond to the reading processes when used as data stores.

The modification which has now been carried out is described diagrammatically in FIG. 1. At the moment when the tip of the STM was in the tunneling region (tunneling current and voltage, see above) just above the sample surface just left of the structures described, it was moved right very rapidly by means of an electrical signal to the x-piezo, so that it rapidly passed over the bump structures. It was essential here that the z-direction control circuit of the scanning tunneling microscope was switched off or the modulation of the voltage of the x-piezo took place quickly enough that the z-direction control circuit was unable to withdraw the tunneling tip before the modification had taken place within its time constant, which was set at about 40 ms, when the tunneling tip encountered the bump structures.

Figure 3:
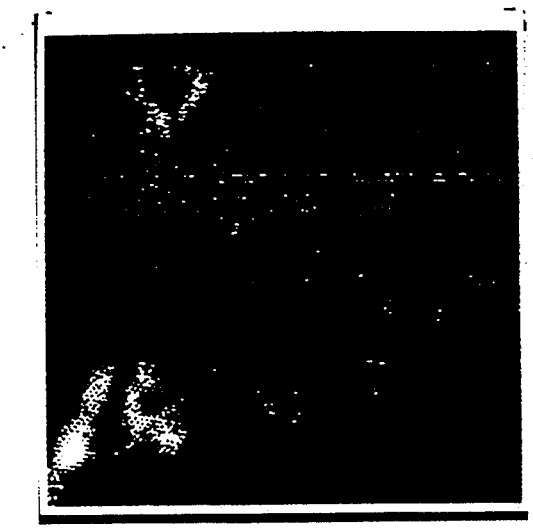
FIG. 3 shows the structures shown in FIG. 2 immediately following modification according to the present invention.

The modification resulting from the measure could be imaged at atomic resolution immediately after the operation. FIG. 3 shows the structures shown in FIG. 2 immediately after the modification process described. It can be seen that the structures, again imaged on an atomic scale, have been significantly flattened, and the tops of the bumps have been reshaped to give a type of plateau. It is important that the atomic order of the lattice of the imaged surface is retained and that no lattice defects are visible, an essential prerequisite for reversibility of the processes carried out. In the present case, the tunneling tip was intentionally moved so far in the x-direction during the modification process that it passed over, and thus also modified, all four structures. FIG. 3 shows that it is in this way not only possible to selectively modify individual bumps, but also to modify entire lines of structures in a defined manner through a suitable choice of the amplitude of the modulation of the position of the piezo during the modification process. Furthermore, it was also possible to carry out further modifications on the same structures.

As shown in FIGS. 1 to 3, the atomic order of the surface, observed using the tunneling microscope, was fully retained during the individual writing and modification processes, in particular immediately at the site of the modifications. No microscopic defects, such as displacements, vacancies or interstitial atoms, can be seen.

Writing and modification processes did not result in an observable change in the tip. Thus, the tip did not change in length during these processes, and neither did the imaging behavior give any indication of possible tip changes (ie. changes in the front-most end of the tunneling tip in the atomic range) which had taken place during the modification.

If the tip is passed over the sample at a very close distance, the bump structures can be not only modified or flattened, but also removed again. Since the writing and erasing processes take place nondestructively, ie. with full retention of atomic order of the imaged surface lattice both at or around the site of modification, a structure can be re-generated at the same position at any time after erasure has taken place. Atomic-scale data stores which can be erased, modified and re-written in any desired sequence at any desired point and whose achievable storage density, derived from the area requirement of the individual structures, is about 1 terabyte per square centimeter, are thus obtained.

We claim:

1. A process for the selective modification and reversible removal of extremely fine structures having dimensions of down to the nanometer and subnanometer range from the surface of a solid, which comprises moving at about room temperature and pressure the fine tip of a probe, which is located at a distance in the Ångstrom range above the surface or is in contact with the surface, over the structure at essentially the same height and thus causing a change in this structure; wherein the atomic order of the atomic lattice of the surface is not disturbed or destroyed, even locally at the site of modification by an intervention.

2. A process as claimed in claim 1, wherein the probe employed is the tip of a scanning tunneling microscope (STM).

3. A process as claimed in claim 1, wherein the probe used is the tip of the lever of a scanning atomic force microscope (SAFM).

4. A process for imaging the surface of a solid at a local resolution in the nanometer or subnanometer range before and/or after the structural modification as claimed in claim 1, which comprises carrying out the imaging of the surface using the same surface-sensitive scanning probe as also used for the structural modification.

* * * * *

UNITED STATES PATENT AND TRADEMARK OFFICE
CERTIFICATE OF CORRECTION

PATENT NO.: 5,343,042

DATED: August 30, 1994

INVENTOR(S): FUCHS et al.

It is certified that error appears in the above-identified patent and that said Letters Patent is hereby corrected as shown below:

Title page, item [54], in the title, "SUBNAMOMETER" should read -- SUBNANOMETER--.

Signed and Sealed this

Fifteenth Day of November, 1994

Attest:

BRUCE LEHMAN

Attesting Officer

Commissioner of Patents and Trademarks